US006275265B1

(12) United States Patent
Kimura et al.

(10) Patent No.: US 6,275,265 B1
(45) Date of Patent: Aug. 14, 2001

(54) VIDEO SIGNAL SYNCHRONIZING APPARATUS

(75) Inventors: Hiromitsu Kimura; Shinichi Takahashi, both of Tokyo (JP)

(73) Assignee: Ikegami Tsushinki Co., Ltd., Tokyo (JP)

( * ) Notice: Subject to any disclaimer, the term of this patent is extended or adjusted under 35 U.S.C. 154(b) by 0 days.

(21) Appl. No.: 09/100,461

(22) Filed: Jun. 19, 1998

(51) Int. Cl.[7] .................................................. H04N 5/04
(52) U.S. Cl. .................... 348/536; 348/505; 348/512; 348/518; 348/537
(58) Field of Search .................. 348/536, 537, 348/510, 518, 512, 516, 505, 500; 327/231, 244, 263; H04N 5/04, 5/95

(56) References Cited

U.S. PATENT DOCUMENTS

| | | | |
|---|---|---|---|
| 4,038,683 | * | 7/1977 | Thorpe et al. ........................ 358/19 |
| 4,122,488 | * | 10/1978 | Mikado .................................. 358/19 |
| 4,498,103 | * | 2/1985 | Aschwanden ........................ 358/148 |
| 4,639,765 | * | 1/1987 | D'Hont ................................. 358/19 |
| 4,680,621 | * | 7/1987 | Baker et al. .......................... 358/19 |
| 4,713,693 | * | 12/1987 | Southworth et al. ................ 358/160 |
| 4,791,488 | | 12/1988 | Fukazawa et al. . |
| 4,803,553 | * | 2/1989 | Schrock et al. ...................... 358/18 |
| 4,847,678 | * | 7/1989 | McCauley ............................. 358/18 |
| 5,528,307 | * | 6/1996 | Owada et al. ....................... 348/537 |

FOREIGN PATENT DOCUMENTS 97 95740    2/1997 (WO) .

\* cited by examiner

Primary Examiner—Reinhard J. Eisenzopf
Assistant Examiner—Jean W. Désir
(74) Attorney, Agent, or Firm—Venable; Robert J. Frank; Michael A. Sartori

(57) ABSTRACT

An apparatus for performing a generator locking for a video signal including a first video processing circuit for processing an input video signal, an expansion module having a second video processing circuit and a delay circuit having a delay time introduced by said second video processing circuit, a synchronizing signal separating circuit for separating a synchronizing signal from an external reference signal, and a phase-lock loop circuit for generating a reference control signal for said first video processing circuit as well as a phase comparison signal. Said phase comparison signal is fed-back to the phase-lock loop circuit by means of said delay circuit. Although the expansion module is connected to the expansion slot, a phase of a finally obtained video signal is remained in a same fixed relationship as a phase relationship when a connection board is connected to the expansion slot.

12 Claims, 15 Drawing Sheets

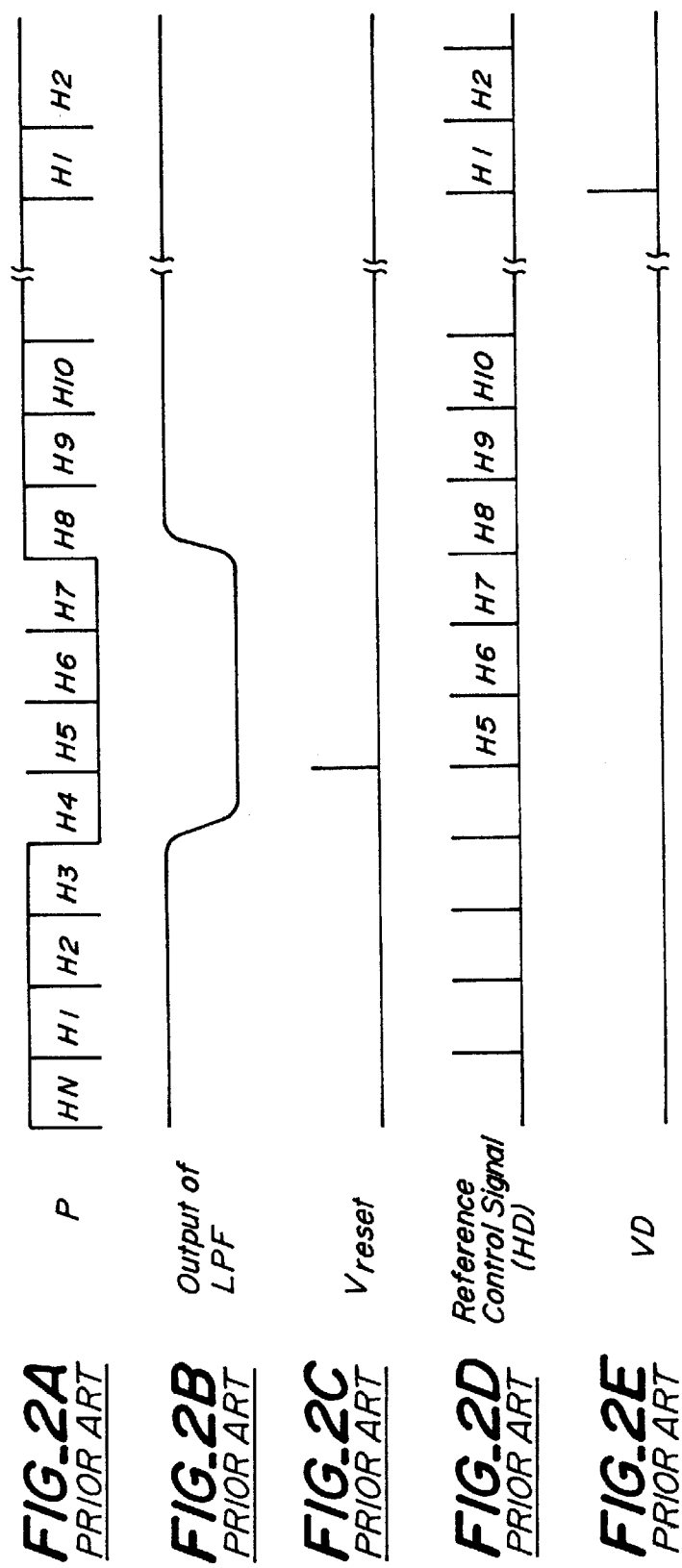

FIG. 3A PRIOR ART    P    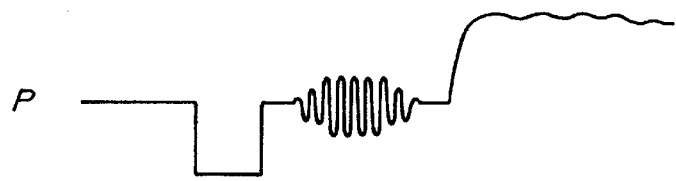
FIG. 3B PRIOR ART    Q    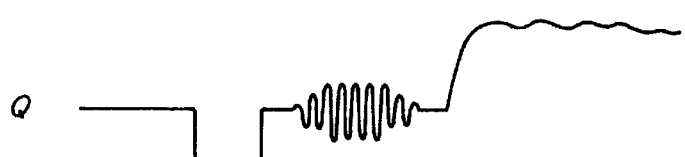
FIG. 3C PRIOR ART    R    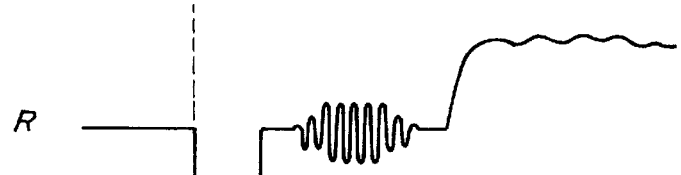
FIG. 3D PRIOR ART    R'   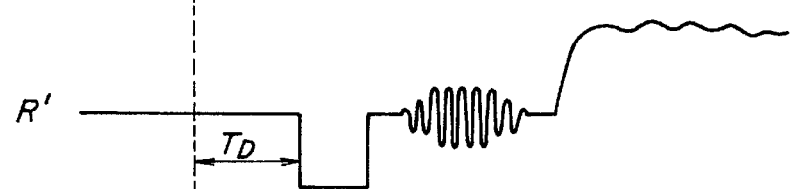
FIG. 3E PRIOR ART    HD   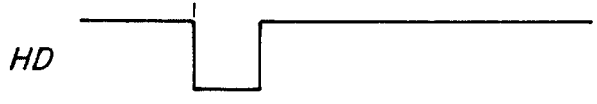
FIG. 3F PRIOR ART    A    

FIG._5A  HD 
FIG._5B  A 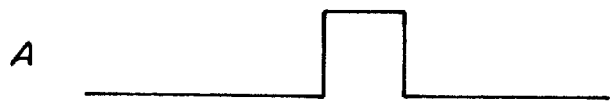
FIG._5C  B 
FIG._5D  C 
FIG._6A  A 
FIG._6B  B 
FIG._6C  C 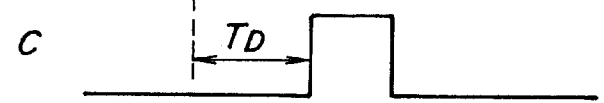
FIG._6D  HD 

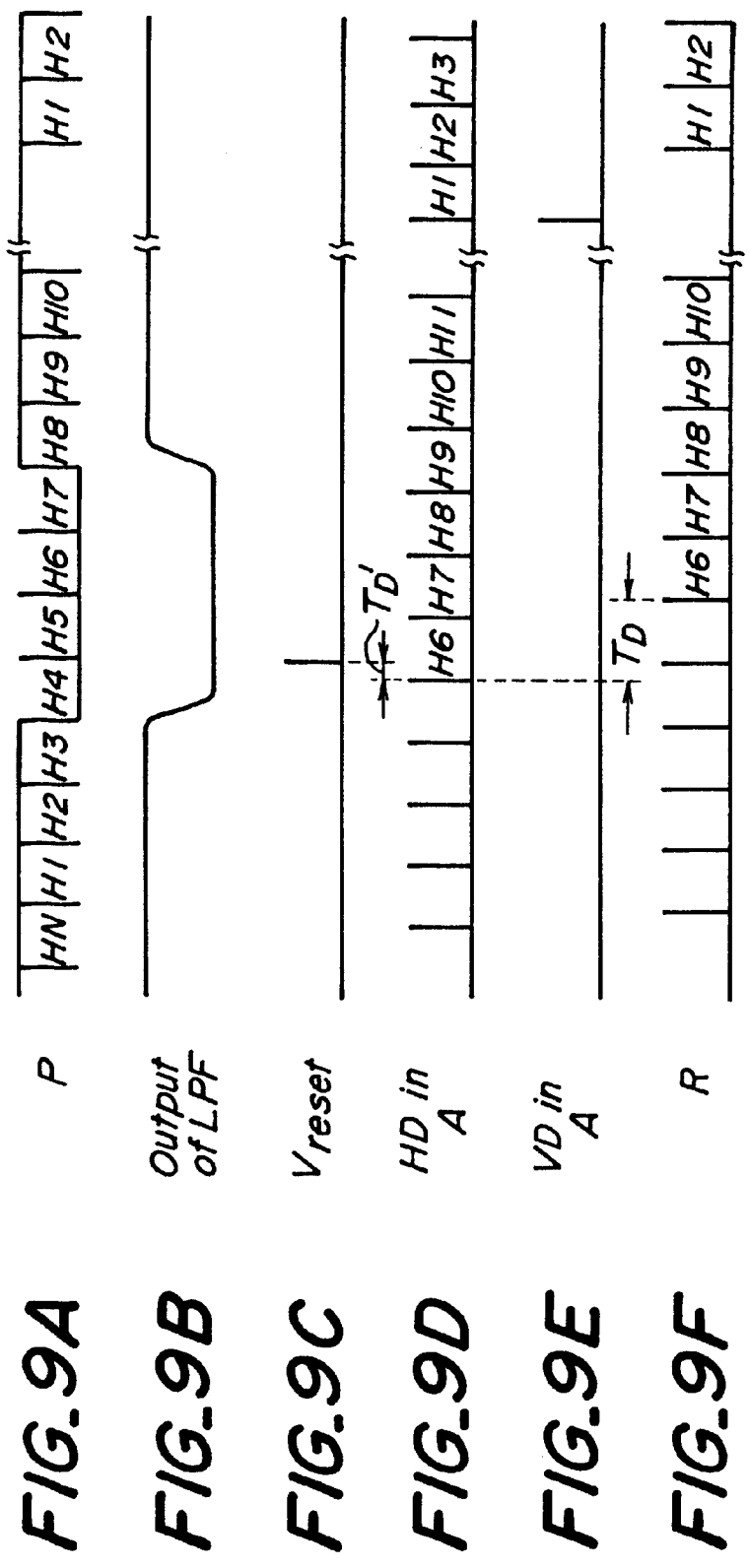

FIG.11A  HD 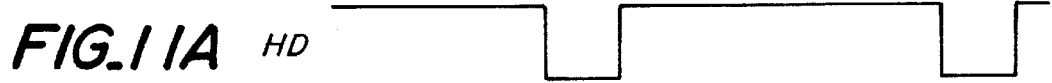
FIG.11B  A 
FIG.11C  Q 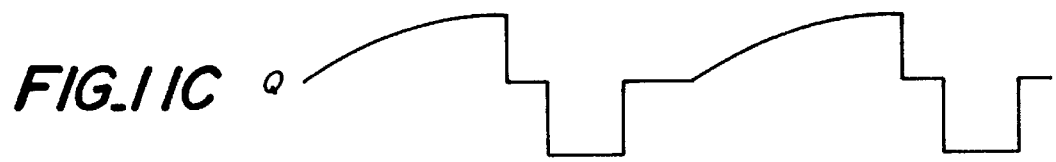
FIG.11D  B 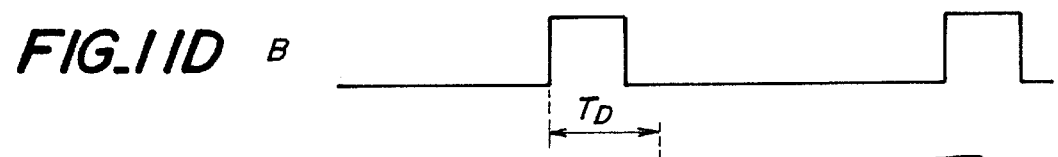
FIG.11E  R 
FIG.11F  C 
FIG.11G  D 

FIG._12A  HD
FIG._12B  A
FIG._12C  Q
FIG._12D  B
FIG._12E  R
FIG._12F  C
FIG._12G  D
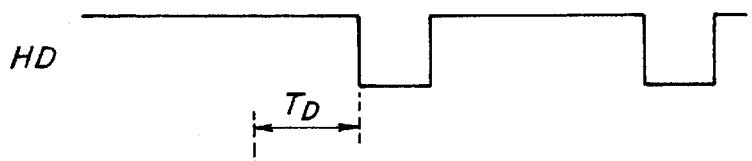
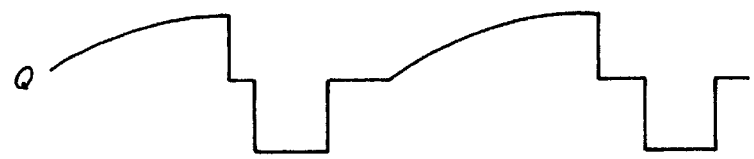
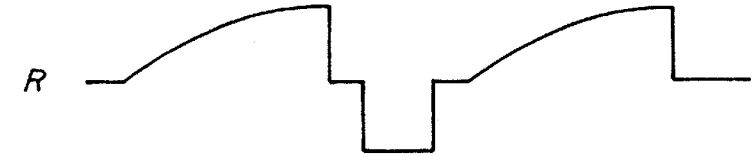
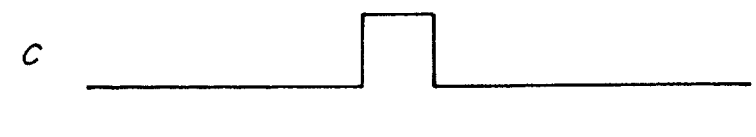
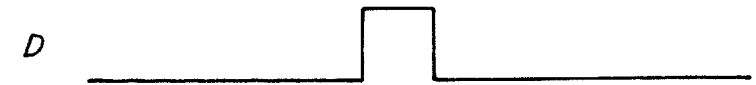

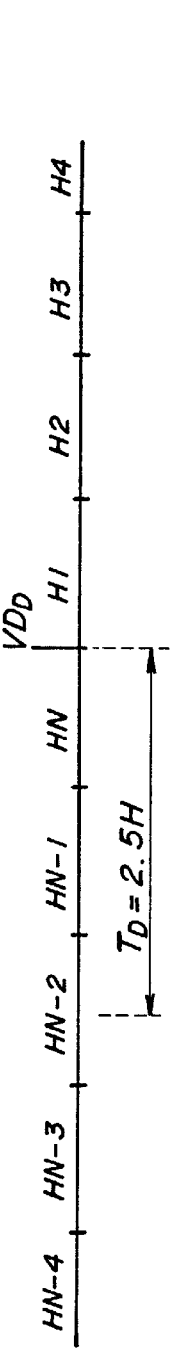
FIG.13A FIG.13B FIG.13C FIG.13D FIG.14A FIG.14B FIG.14C FIG.14D

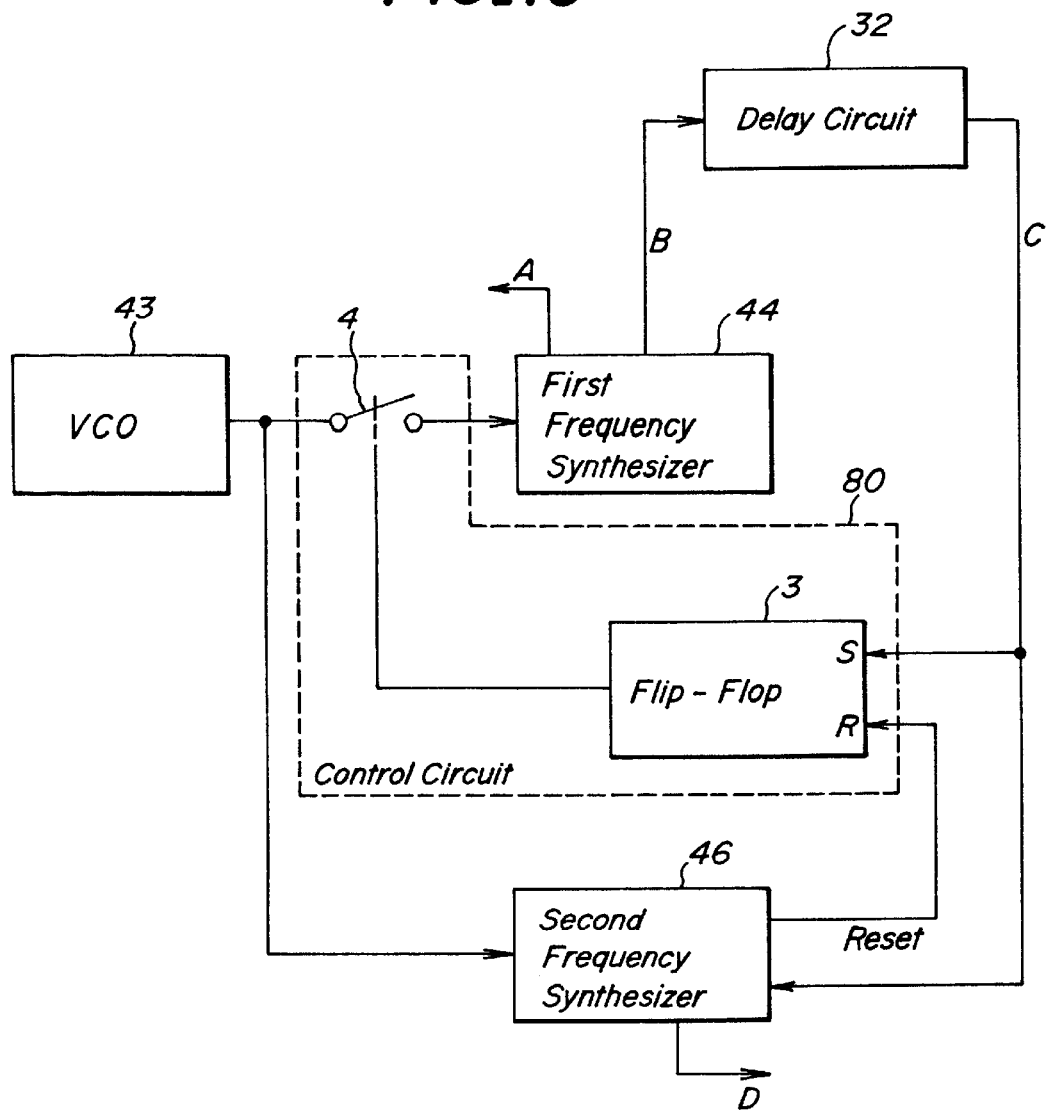
FIG_15

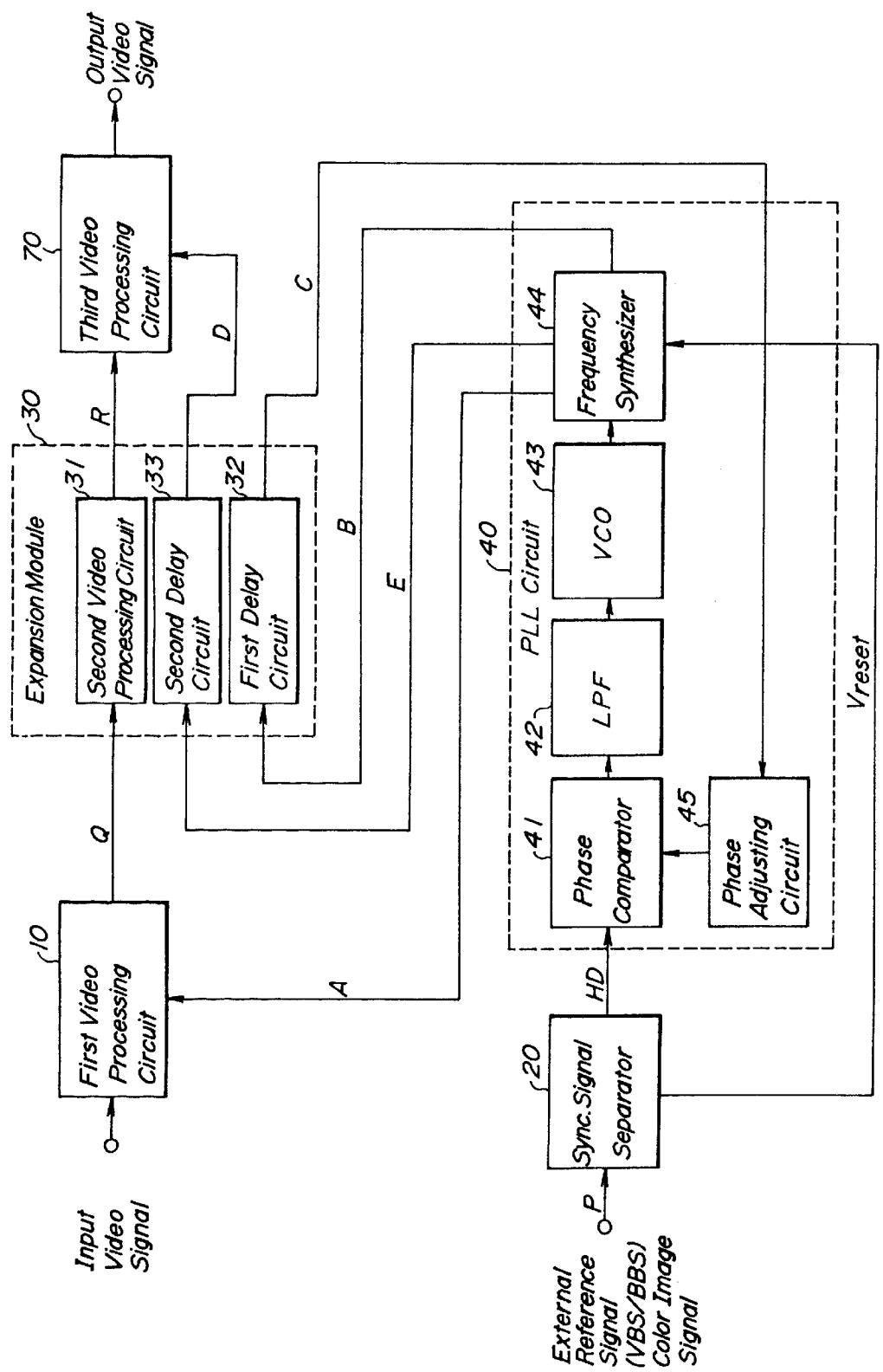
FIG_16

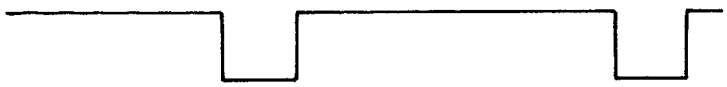
FIG_17A HD
FIG_17B A
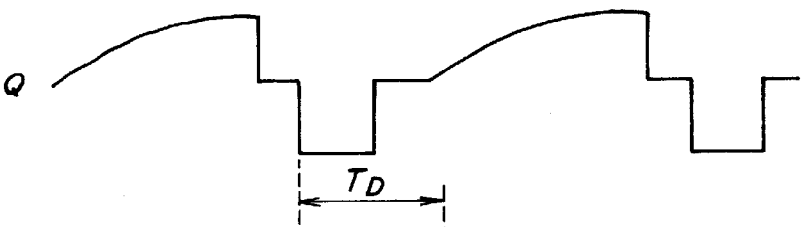
FIG_17C Q
$T_D$
FIG_17D B
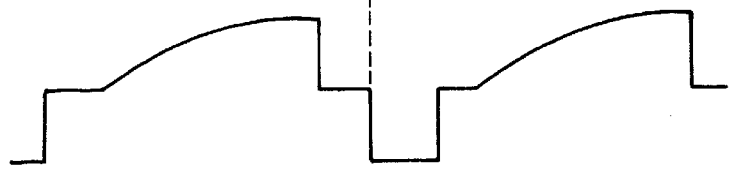
FIG_17E R
FIG_17F C
FIG_17G D
FIG_17H E

FIG. 18A  HD
FIG. 18B  A
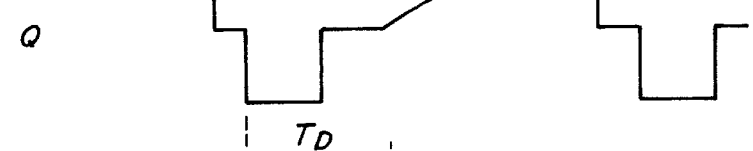
FIG. 18C  Q
FIG. 18D  B
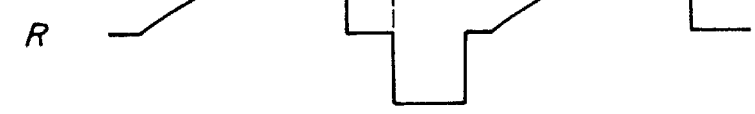
FIG. 18E  R
FIG. 18F  C
FIG. 18G  D
FIG. 18H  E

VIDEO SIGNAL SYNCHRONIZING APPARATUS

BACKGROUND OF THE INVENTION

1. Field of the Invention

The present invention relates to a video signal synchronizing apparatus applicable to a video signal processing instrument having an expansion slot.

2. Description of the Related Art

A personal computer usually has at least one expansion slot for detachably connecting an expansion module to the personal computer in order to enhance a faculty of the personal computer. In a television camera system particularly for broadcasting use, there has been required to provide an expansion slot for connecting an expansion module such as noise compression module special video effect module. However, bringing such a requirement to completion could not be satisfied easily. This is due to a fact that in the television camera system, a time lag required for processing a video signal by an expansion module could not be ignored.

In a television camera system for business use or broadcasting use, it is sometimes required to synchronize the relevant television camera system with another video processing instruments such as television camera system and video recording and reproducing system. Such a synchronization is generally called a generator locking (GEN-Lock). Therefore, when an expansion module is connected to the television camera system, the GEN-Lock has to be performed by considering a time lag introduced by the expansion module. In general video cameras and video tape recorders for private use or domestic use, it is not necessary to take the GEN-Lock, and thus a time delay due to an expansion module including a video processing circuit dose not cause any problem. However, in the video processing instruments for business use or broadcasting use, the GEN-Lock is strictly required for synchronizing output video signals with an external reference signal, and when an expansion module having a time delay is added, a predetermined GEN-Lock could not be attained.

FIG. 1 is a block diagram showing a known GEN-Lock apparatus applied to a television camera system. There are provided a video signal generator 50 for generating a video signal, a video signal processing circuit 10, a synchronizing signal (sync-signal) separating circuit 20 for separating a synchronizing signal from an external reference signal (VBS/B13S), and a PLL (phase-lock loop) circuit 40 for generating a reference control signal whose phase is locked with the external reference signal. In this example, the PLL circuit 40 generates a horizontal driving signal whose phase is locked with a horizontal synchronizing signal HD supplied from the synch-signal separating circuit 20. The GEN-Lock apparatus further comprises an expansion module 30, which may be detachably connected to an expansion slot provided on an output side of the video processing circuit 10.

The expansion module 30 comprises a video processing circuit 31 for further processing an output video signal from the video processing circuit 10.

The PLL circuit 40 includes a phase detector or comparator 41, a low pass filter 42; a voltage controlled oscillator 43, a frequency synthesizer 44 and a phase adjusting circuit 45, these units being connected to constitute a loop. The frequency synthesizer includes a counter for counting a signal from the voltage controlled oscillator 43 and decoder for producing pulses at predetermined count values of the counter. In the present specification, such pulses are termed as a reference control signal. The reference control signal generated by the frequency synthesizer 44 is supplied to the video processing circuit 10, and the video processing circuit operates at timings controlled by the reference control signal. In the video signal generator 50, an optical image formed by a camera lens 60 is made incident upon an image sensing element 51 and is converted into a video signal. The image sensing element 51 is driven by a driving circuit 52, The thus converted video signal is outputted from the video signal generator 50 The driving circuit 52 is directly or indirectly controlled by the reference control signal A supplied from the frequency synthesizer 44. Therefore, the video signal supplied to the video processing circuit 10 is synchronized with the reference control signal A.

In the video processing circuit 10, from the reference control signal A there are formed various pulses such as clamping pulse and blanking pulse. In general, the reference control signal A includes the horizontal driving signal HD and vertical driving signal VD, and these driving signals are supplied on separate transmission lines or on a common transmission line as a composite signal.

The clamping pulse, blanking pulse and other pulses required for the video processing may be directly supplied from the frequency synthesizer 44 to the video processing circuit 10. In the following explanation, it is assumed that the horizontal and vertical driving signals HD and VD are supplied from the frequency synthesizer 44 to the video processing circuit 10.

At first, the horizontal synchronization will be explained. The operation of the PLL circuit 40 has been well known in the art, and therefore its explanation is dispensed with here, Furthermore, for the time being, the expansion module 30 is not connected to the expansion slot, and thus the video signal Q generated from the video processing circuit 10 is supplied to an output terminal as a finally processed video signal.

As explained above, the frequency synthesizer 44 generates the reference control signal A which is supplied to the video signal generator 50 and video processing circuit 10. The frequency synthesizer 44 further generates a signal having a horizontal period, and this signal is supplied via the phase adjusting circuit 45 to the phase comparator 41 to which is also supplied the horizontal driving signal HD extracted by the synch-signal separating circuit 20. Then, the phase comparator 41 produces a phase difference between these signals having the horizontal period. The PLL circuit 40 operates to make this phase difference to be zero, and a phase of the finally obtained video signal Q is synchronized with a phase of the external reference signal P.

Next, the vertical synchronization will be briefly explained with reference to timing charts shown in FIGS. 2A–2E.

Now it is assumed that a horizontal phase of the finally obtained video signal Q has been locked with a phase of the external reference signal (BBS) P, but these vertical phases are deviated from each other. FIGS. 2A and 2B represent a phase relationship between the external reference signal P and an output signal from a low pass filter (not shown) provided in the sync-signal separating circuit 20. When the output of this low pass filter (LPF) becomes lower level, a vertical reset pulse $V_{reset}$ is generated in synchronism with the horizontal synchronizing signal as depicted in FIG. 2C. Here, the vertical synchronizing signal (V-sync) has a period of H4–H7. It should be noted that the actual external reference signal P is different from that shown in FIG. 2A, but for the sake of explanation, it is simplified. Other signals are also simplified. Furthermore, in FIG. 2, the equivalent pulse is not shown, because this pulse is irrelevant to the GEN-Lock operation.

When the vertical reset signal $V_{reset}$ is generated by the sync-signal separating circuit 20 as shown in FIG. 2C, the counter provided in the frequency synthesizer 44 is reset and the frequency synthesizer starts to produce horizontal driving pulses H5, H6, H7—as illustrated in FIG. 2D. In this manner, the horizontal and vertical phases of the reference control signal A supplied from the frequency synthesizer 44 are locked with those of the external reference signal P, and therefore the phase of the video signal Q supplied from the video processing circuit 10 is locked with the external reference signal P.

The video signal supplied to the video processing circuit 10 is processed to be synchronized with the reference control signal A, from the PLL circuit 40. When no expansion module is connected to the expansion slot, a connection board which merely transmits the video signal without a time delay is inserted into the expansion slot.

FIGS. 3A–3F show waveforms of various signals. FIG. 3A illustrates the external reference signal P supplied to the sync-signal separating circuit 20, FIG. 3B represents the output signal Q supplied from the video processing circuit 10, and FIG. 3C illustrates the finally obtained video signal R supplied from the video processing circuit 31 provided in the expansion module 30 to the output terminal. When the video processing circuit 31 provided in the expansion module 30 does not introduce a time delay, a phase of the video signal Q generated by the video processing circuit 10 is identical with that of the finally obtained video signal R. However, when the video processing circuit 31 in the expansion module 30 has a time delay, a phase of the finally obtained video signal R' supplied from the video processing circuit 31 of the expansion module 30 is delayed by the delay time $T_D$ as shown in FIG. 3D. Therefore, the output video signal R' from the video processing circuit 31 of the expansion module 30 is delayed by the delay time $T_D$ with respect to the external reference signal P.

FIG. 3E shows the horizontal driving signal HD supplied from the sync-signal separating circuit 20 and FIG. 3F illustrates the reference control signal A generated by the frequency synthesizer 44.

In order to make a phase of the finally obtained video signal R' from the video processing circuit 31 of the expansion module 31 identical with a phase of the external reference signal P, it is necessary to adjust the phase adjusting circuit 45 in the PLL circuit 40 such that a phase of the reference control signal A is advanced by the delay time $T_D$. If the delay time $T_D$ is large, the phase adjusting circuit 45 has to be constructed to have a wide phase adjusting range. Therefore, the phase adjusting circuit 45 becomes complicated and large.

Moreover, when the presently used expansion module 30 is replaced by another expansion module having a delay time different from that of the presently used expansion module, it is necessary to readjust the phase adjusting circuit 45. This phase adjusting operation is rather cumbersome and requires an experienced skill,

SUMMARY OF THE INVENTION

The present invention has for its object to provide a novel and useful apparatus for performing the GEN-Lock for a video signal, in which the above mentioned problems of the known GEN-Lock apparatus can be mitigated and a delay time of a video processing circuit provided in an expansion module can be automatically compensated for without requiring cumbersome and skillful adjustment.

According to the invention, an apparatus for performing a generator locking for a video signal comprises;

A video processing means for processing an input video signal under a control of a reference control signal;
  a phase-lock loop for generating said reference control signal by detecting a phase relationship between an external reference signal supplied to the phase-lock loop and a phase comparison signal having a predetermined phase relationship with said reference control signal;
  an expansion module having a video processing circuit for processing the video signal and a delay circuit having a delay time which is related to a delay time introduced by said video processing circuit, and
  a means for feeding-back said phase comparison signal to said phase-lock loop by means of said delay circuit provided in the expansion module.

Upon practicing the GEN-Lock apparatus according to the invention, the expansion module may be connected to a last stage of the video processing means or may be connected between a first state and a last stage of the video processing means. In the former case, the phase comparison signal is supplied to a phase comparator provided in the phase-lock loop by means of the delay circuit provided in the expansion module.

In the later case, the expansion module contains first and second delay circuits having the same delay time, and not only the phase comparison IS signal is delayed by said first delay circuit, but also the reference control signal for a video processing stage succeeding to the expansion module is delayed by said second delay circuit.

According to the invention, the delay time of said delay circuit may be equal to a delay time introduced by the video processing circuit provided in the expansion module.

As is well known in the art, the phase-lock loop comprises a phase comparator for detecting a phase difference between said external reference signal and the phase comparison signal, an oscillator such as a voltage controlled oscillator for generating a signal having a frequency which is changed in accordance with said phase difference, a frequency synthesizer for counting the output signal of the oscillator and generating said reference control signal at suitable timings, and a phase adjusting circuit for adjusting a phase of the phase comparison signal.

According to the inventions the reference control signal may include a horizontal driving signal HD.

BRIEF DESCRIPTION OF THE DRAWINGS

FIGS. 2A–2E are timing charts representing phase relationship of various signals in the known GEN-Lock apparatus;

FIGS. 3A–3F are signal waveforms of various signals appearing in the known GEN-Lock apparatus when an expansion module is connected to the apparatus;

FIGS. 5A–5D are timing charts explaining the horizontal synchronizing operation of the apparatus shown in FIG. 4 without expansion module and delay circuit, FIGS. 6A–6D are timing charts explaining the horizontal synchronizing operation of the apparatus of FIG. 4 with expansion module and delay circuit;

FIGS. 9A–9F are timing charts explaining the vertical synchronizing operation of the apparatus shown in FIG. 4, in which the vertical phase of the reference control signal is locked with the horizontal phase of the external reference signal;

FIGS. 11A–11G are timing charts explaining the horizontal synchronizing operation of the apparatus shown in FIG. 10 without the delay circuit;

FIGS. 12A–12G are timing charts explaining the horizontal synchronizing operation of the apparatus of FIG. 10 with the delay circuit;

FIGS. 13A–13D and FIGS. 14A–14D are timing charts explaining the vertical synchronizing operation of the apparatus shown in FIG. 10;

FIG. 15 is a block diagram illustrating a detailed construction of a so control circuit shown in FIG. 10, FIG. 16 is a block diagram illustrating a third embodiment of the GEN-Lock apparatus according to the invention;

FIGS. 17A–17H are timing charts explaining the horizontal synchronizing operation of the apparatus shown in FIG. 16 without the delay circuit, and FIGS. 18A–18H are timing charts explaining the horizontal synchronizing operation of the apparatus illustrated in FIG. 16 with the delay circuit.

DESCRIPTION OF THE PREFERRED EMBODIMENT

Now the present invention will be explained in detail with reference to the accompanied drawings. It should be noted that since the video signal generator is not important for the present invention, it is not shown in the embodiments.

Figure 1:
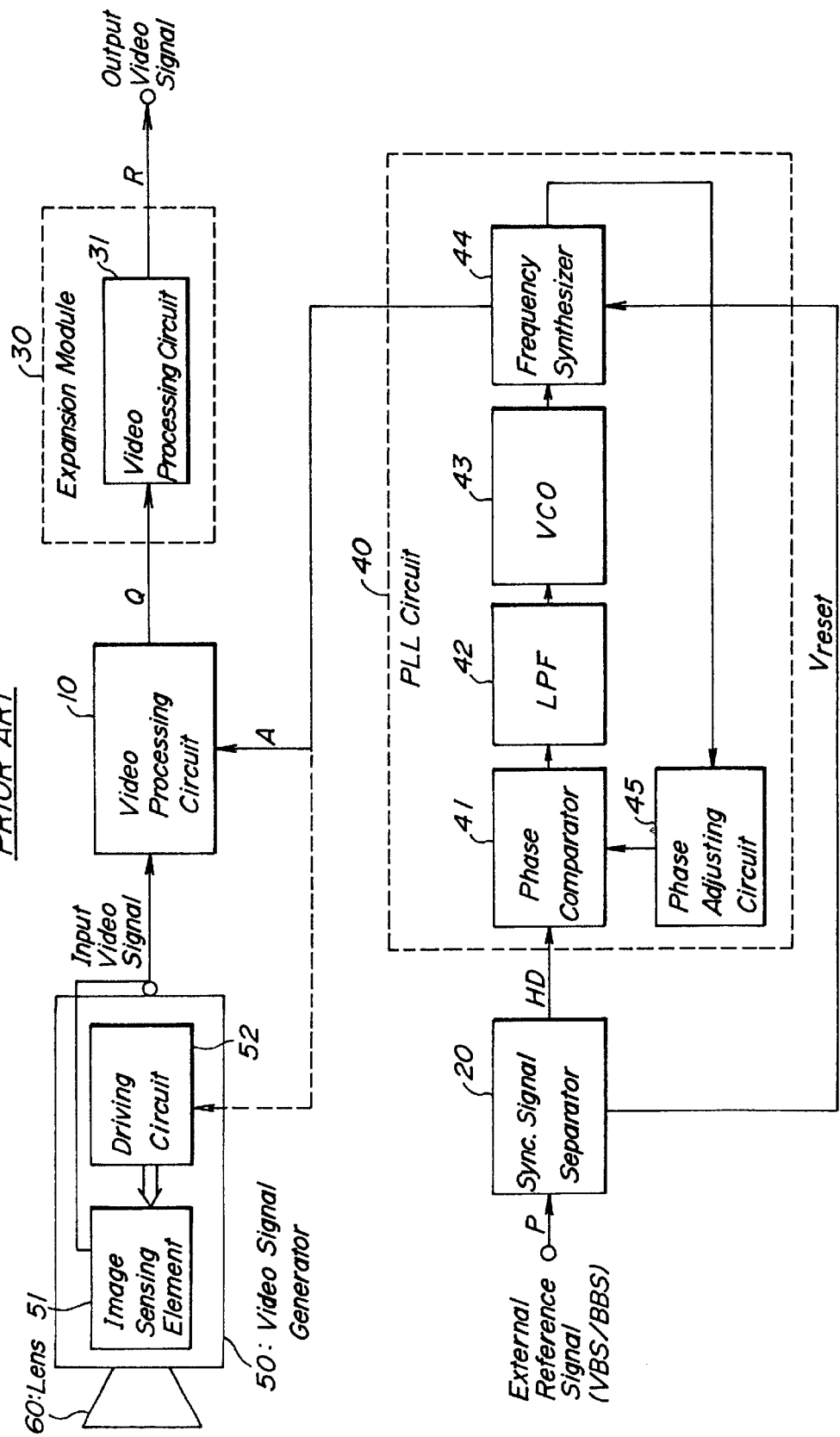
FIG. 1 is a block diagram showing a known GEN-Lock apparatus.
Figure 4:
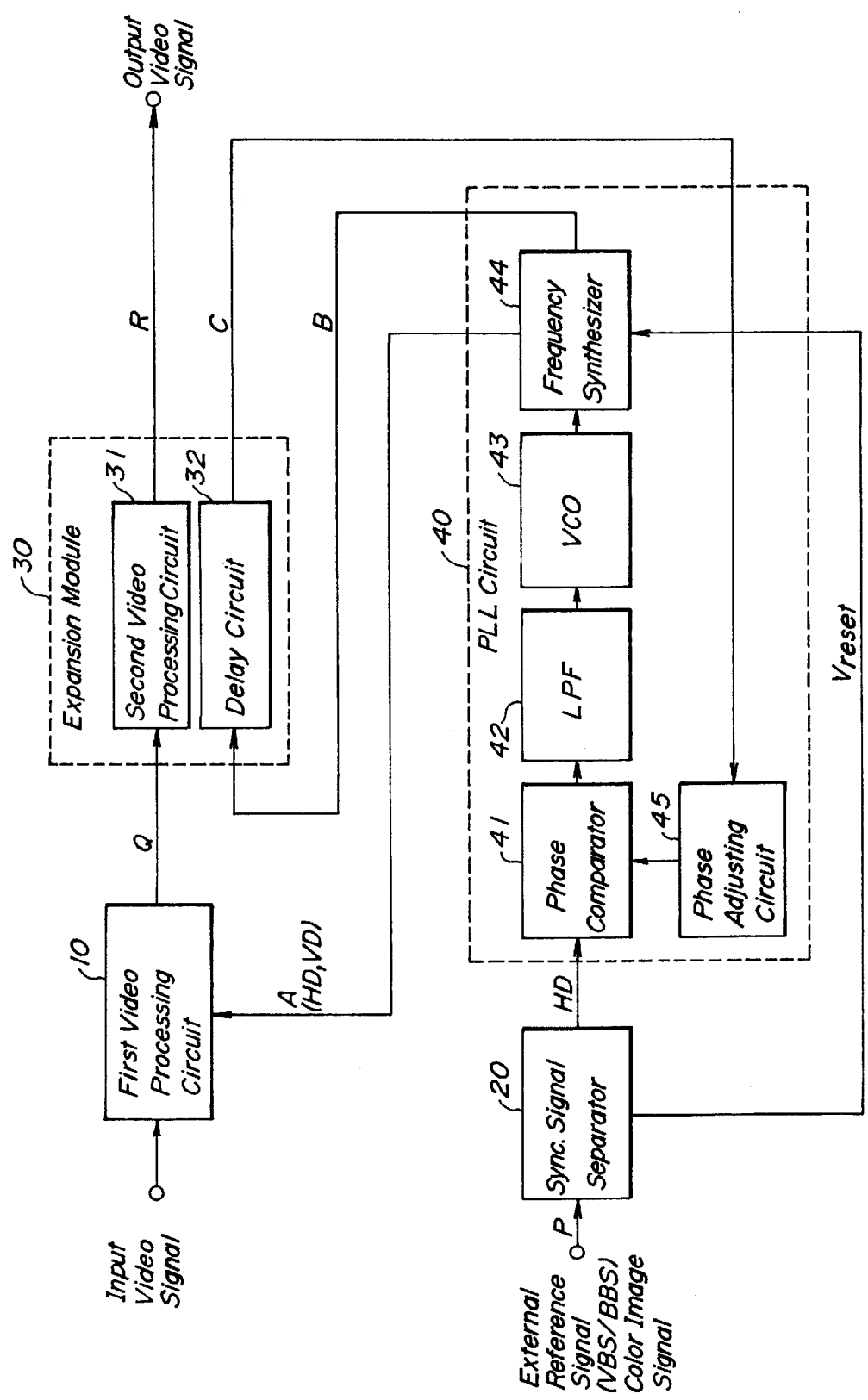
FIG. 4 is a block diagram showing a first embodiment of the GEN-Lock apparatus according to the invention.
Figure 7A:
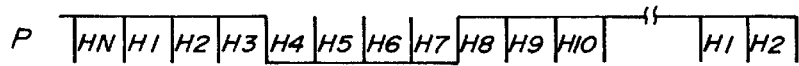
FIGS. 7A–7F are timing charts explaining the vertical synchronizing operation of the apparatus shown in FIG. 1 when the delay time is not longer than a horizontal period.
Figure 7B:
Figure 7C:
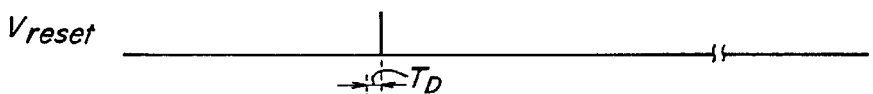
Figure 7D:
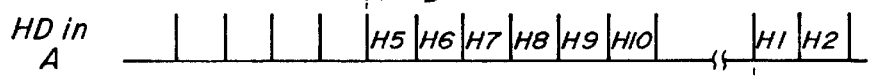
Figure 7E:
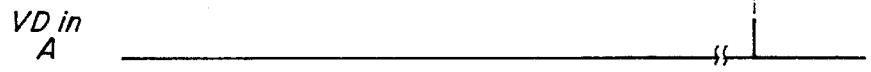
Figure 7F:
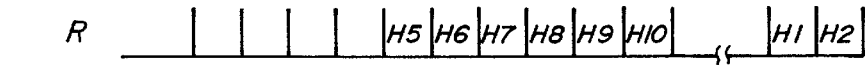
Figure 8A:
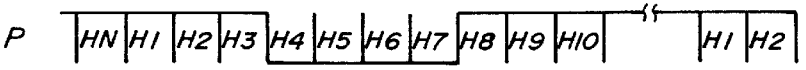
FIGS. 8A–8F are timing charts explaining the vertical synchronizing operation of the apparatus shown in FIG. 1 when the delay time is longer than a horizontal period.
Figure 8B:
Figure 8C:
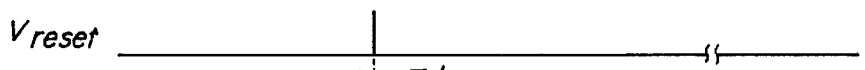
Figure 8D:
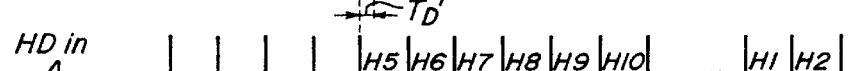
Figure 8E:
Figure 8F:
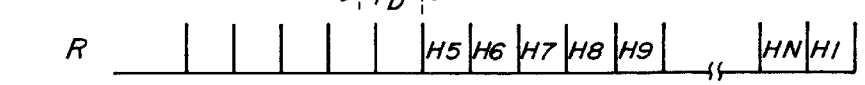

FIG. 4 is a block diagram showing a first embodiment of the GEN-Lock apparatus according to the invention. In this embodiment, portions similar to those shown in FIG. 1 are denoted by the same reference numerals used in FIG. 1 and their detailed explanation is dispensed with. It should be noted that for the sake of explanation the video processing circuit 10 is termed as a first video processing circuit and the video processing circuit 31 provided in the expansion module 30 is called a second video processing circuit. The present invention differs from the known apparatus in a point that a delay circuit 32 is provided in the expansion module 30 in addition to the second video processing circuit 31, and a reference control signal B generated by the frequency synthesizer 44 is fed-back to the loop of the PLL circuit 40 via the delay circuit 32. That is to say, an output signal C from the delay circuit 32 is supplied to the phase adjusting circuit 45 as the phase comparison signal.

Now the operation of the GEN-Lock apparatus shown in FIG. 4 will be explained with reference to timing charts illustrated in FIGS. 5–9. When the expansion module 30 having the video processing circuit is not connected to the expansion slot, a connection board is connected to the expansion slot. Then, the video signal passes through the connection board as it is without introducing any delay. In this case, the reference control signal B supplied from the frequency synthesizer 44 is not delayed at all, and is supplied to the phase comparator 41 via the phase adjusting circuit 45 as it is. Therefore, timings of various signals HD, A, B and C are identical with those of the known apparatus as shown in FIGS. 5A–5D, When the expansion module 30 is inserted into the expansion slot and the second video processing circuit 31 is connected in the video processing line, there is produced a phase difference $T_D$ between the output video signal Q from the first video processing circuit 10 and the output video signal R from the second video processing circuit 31. In this case, the horizontal driving signal HD in the reference control signal B is also delayed by TD by means of the delay circuit 32, and the thus delayed reference control signal C is supplied to the phase comparator 41 as the phase comparison signal through the phase adjusting circuit 45. Then, the frequency synthesizer 44 operates at a phase which is advanced by $T_D$ under the control of the PLL circuit 40. Therefore, the control signals A, B, C and HD are generated at timings as shown in FIGS. 6A–6D and the finally obtained video signal R becomes in-phase with the horizontal phase of the external reference signal P irrespective of the expansion module 30 inserted into the expansion slot In this manner, the horizontal synchronization, namely adjusting the phase of the frequency synthesizer output signal with respect to the external reference signal can be attained.

Now the vertical synchronization will be explained. At first, it is assumed that the delay time of the delay circuit 32 is shorter than one horizontal period H.

As shown in FIG. 6, in this case, the horizontal phase of the reference control signal A supplied from the frequency synthesizer 44 is advanced by the delay time TD with respect to the horizontal driving signal HD separated from the external reference signal P. Therefore, when a vertical reset signal $V_{reset}$ is generated by the sync-signal separating circuit 20, a horizontal driving signal H5 has been already initiated as illustrated in FIGS. 7A–7F. In other words, the vertical reset signal $V_{reset}$ appears during the time period of the horizontal driving pulse. In this manner, the horizontal driving signal HD and vertical driving signal VD in the reference control signal A are synchronized with the external reference signal P with the delay time $T_D$. Therefore, the vertical phase of the finally obtained video signal R is synchronized with the vertical phase of the external reference signal P.

When the delay time $T_D$ of the second video processing circuit 31 in the expansion module 30 is longer than one horizontal period H, e.g. $T_D$=1.3H, an appearance horizontal phase difference $T_D'$ between the external reference signal P and the reference control signal A becomes 0.3H ($T_D'$=0.3H) as shown in FIGS. 8A–8F. Therefore, when the vertical reset signal $V_{reset}$ is generated during a period of a horizontal driving signal H5 in the reference control signal A, the video signal R is delayed by more than one horizontal period H by the expansion module 30, and thus the vertical phase of the vertical driving signal VD in the reference control signal A deviates from the vertical phase of the external reference signal FP.

Since an amount of the delay time of the delay circuit 32 is known, the vertical phase of the vertical driving signal VD in the reference control signal A generated by the frequency synthesizer 44 may be manually corrected by means of a switch. That is to say, in the above example, when the vertical reset signal $V_{reset}$ becomes high level, the horizontal period of the reference control signal A is changed from H5 to H6. Then, the vertical phase of the video signal R becomes in-phase with the vertical phase of the external reference signal P. Further, the expansion module 30 may comprise a means for generating an identification signal for the delay time, and the vertical phase of the reference control signal A generated from the frequency synthesizer 44 may be automatically switched by said identification signal.

In this manner, although the delay time $T_D$ of the second video processing circuit 31 in the expansion module 30 is longer than one horizontal period H, it is possible to correct the vertical phase of the reference control signal A by setting the delay circuit 32 to have such a delay time.

In the above explanation, a phase difference between the reference control signal A and the reference control signal 13 is assumed to be zero. However, there may be introduced a phase difference between these reference control signals A and B by taking into account of a time required for producing blanking pulse, clamp pulse and so on from the reference control signal A as well as timings at which the video signal is processed by these pulses. Furthermore, the vertical synchronization may be attained by various ways.

In the embodiment shown in FIG. 4, the expansion module 30 is arranged after the first video processing circuit 10 and no video processing circuit is provided after the expansion module, and therefore the output video signal R from the expansion module is supplied to the video signal output terminal as the finally obtained video signal. In practical apparatuses, the expansion module is often provided within the video processing section. In such a case, the frequency synthesizer 44 could not generate various kinds of reference control pulses for the video processing circuit connected after the expansion module.

Figure 10:
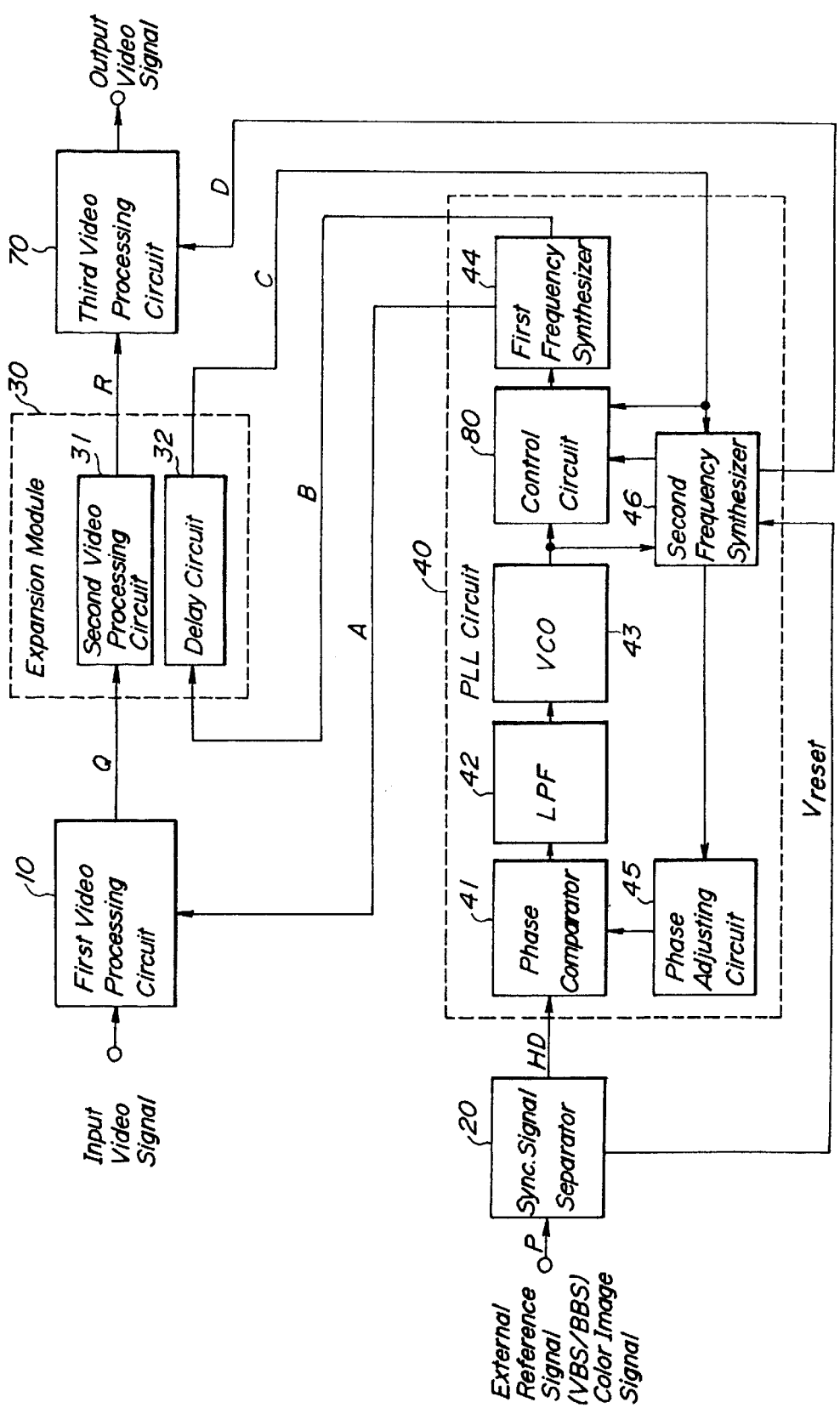
FIG. 10 is a block diagram depicting a second embodiment of the GEN-Lock apparatus according to the invention.

FIG. 10 is a block diagram showing a second embodiment of the GEN-Lock apparatus according to the invention, in which the expansion module 30 having the second video processing circuit 31 is arranged between the first video processing circuit 10 and a second video processing circuit 70. In this embodiment, the PLL circuit 40 comprises first and second frequency synthesizers 44 and 46. The first frequency synthesizer 44 generates the reference control signal B which is supplied via the delay circuit 32 provided in the expansion module 30 and the delayed reference control signal C is supplied to the second frequency synthesizer 46. An output signal from the frequency synthesizer 46 is supplied to the phase comparator 41 via the phase adjusting circuit 45. A reference control signal D for the third video processing circuit 70 is generated by the second frequency synthesizer 46. The first and second frequency synthesizers 44 and 47 are driven by the output signal from the voltage controlled oscillator 43 and are controlled by a control circuit 80 such that they produce the output pulses having the same repetition period. This operation will be explained hereinafter in detail.

FIGS. 11A–11G are timing charts for explaining the operation of a GEN-Lock apparatus, in which the delay circuit 32 having a delay time $T_D$ is removed from the expansion module 30. In this case, the horizontal phase of the video signal R generated from the second video processing circuit 31 in the expansion module 30 is delayed with respect to the external reference signal P by $T_D$ due to the delay introduced by the second video processing circuit 31 in the expansion module 30.

FIGS. 12A–12G are timing charts representing the operation of the GEN-Lock apparatus shown in FIG. 10, in which the delay circuit 32 is provided in the expansion module 30. The reference control signal C generated by the first frequency synthesizer 44 and delayed by the delay circuit 32 in the expansion module 30 is supplied to the second frequency synthesizer 46 and is further supplied to the phase adjusting circuit 45 as the phase comparison signal. Then, the horizontal driving signal HD separated from the external reference signal P by the sync-signal separating circuit 20 and the reference control signal C are supplied to the phase comparator 41 to detect a phase difference between these signals. The PLL circuit 40 operates to make this phase difference zero. Therefore, the horizontal phase of the reference control signal A is advanced by TD with respect to the horizontal driving signal HD separated from the external reference signal P (see FIGS. 12A and 12B). The second frequency synthesizer 46 generates the reference control signal D for the third video processing circuit 70. It should be noted that the third video processing circuit 70 does not introduce a time delay, Said reference control signal D is in-phase with the reference control signal C (see FIGS. 12F and 12G), and therefore the finally processed video signal R is locked with the horizontal driving signal HD of the external reference signal P.

Now the vertical synchronization in the present embodiment will be explained. For the time being, it is assumed that the horizontal phase of the reference control signal A is correctly locked with the external reference signal P.

Since the first and second frequency synthesizers 44 and 46 are commonly driven by the output signal from the voltage controlled oscillator 43, the horizontal driving signals HD generated by these frequency synthesizers have the same period and similarly the vertical driving signals VD generated by these frequency synthesizers have the same period. However, phases of these signals are shifted. As explained above, the horizontal phase of the first frequency synthesizer 44 is advanced by $T_D$ with respect to the external reference signal P. The second frequency synthesizer 46 generates the horizontal driving signal HD on the basis of the pulse which is delayed by $T_D$ with respect to the first frequency synthesizer 44. Therefore, the reference control signal D for the third video processing circuit 70 becomes in-phase with the horizontal phase of the external reference signal P.

Therefore, when the vertical reset signal $V_{reset}$ is supplied from the sync-signal separating circuit 20 to the second frequency synthesizer 46, the vertical phase of the reference control signal D generated from the second frequency synthesizer 46 is synchronized with the horizontal phase.

When the second frequency synthesizer 46 and control circuit 80 receive the vertical driving signal $VD_B$ delayed by the delay circuit 32, the first frequency synthesizer 44 stops its operation temporally. When a count value of the second frequency synthesizer 46 becomes H1, the first frequency synthesizer 44 starts again. That is to say, the first frequency synthesizer 44 stops its operation at a timing which is delayed from H1 by $T_D$, and keeps this non-counting operation until the second frequency synthesizer 46 starts to count H1. Therefore, there is produced a phase difference of $T_D$ between the reference control signal B for the second video processing circuit 31 in the expansion module 30 and the reference control signal D for the third video processing circuit 70.

FIGS. 13A–13D and 14A–14D show timing charts explaining the operation in which the delay circuit 32 has a delay time $T_D$ equal to 2.5H. In this case, when a time $T_D$ elapses after the first frequency synthesizer 44 generates the signal $VD_B$, the second frequency synthesizer 46 receives the signal $VD_B$ delayed by the delay circuit 32 at a timing of the reference control signal C as illustrated in FIG. 13C. The signal $VD_B$ delayed by the delay circuit 32 is also supplied to the control circuit 80. Then, the first frequency synthesizer 44 stops its counting operation, Therefore, the reference control signal B generated by the first frequency synthesizer 44 remains H3. A timing of the generation of the signal $VD_B$ from the first frequency synthesizer 44 is in a period of time HN-4 of reference control signal D as shown in FIG. 13B. However, the second frequency synthesizer 46 does not stop its counting operation, and the first frequency synthesizer 45 starts its counting operation again at timings shown in FIGS. 14A–14D.

Therefore, there can be generated the reference control signals for the third video processing circuit 70 with a given phase relationship with respect to the external reference signal P. It should be noted that a phase of a pulse supplied from the second frequency synthesizer 46 to the phase adjusting circuit 45 is identical with the reference control signal C. In this manner, a desired phase difference can be introduced between the reference control signal A for the first video processing circuit 10 and the reference control signal D for the third video processing circuit 70 irrespective of a value of the delay time TD of the second video processing circuit 31 in the expansion module 30.

FIG. 15 is a block diagram showing an embodiment of the control circuit 80. The control circuit 80 comprises a flip-flop 3 whose set terminal S is connected to the second frequency synthesizer 46 as well as to the delay circuit 32 and whose reset terminal R is connected to a reset terminal of the second frequency synthesizer 46, and a switch 4 driven by the flip-flop 3. The output signal from the voltage controlled oscillator 43 is supplied to the first frequency synthesizer 44 by means of the switch 4.

To the second frequency synthesizer 46, is directly supplied the output signal from the voltage controlled oscillator 43. When the output of the flip-flop 3 is at a low level, the switch 4 is made on, and when the output of the flip-flop is at a high level, the switch is made off.

Now it is assumed that the output of the flip-flop 3 is at a low level and the switch 4 is made on. The vertical driving signal $VD_B$ in the reference control signal A generated by the first frequency synthesizer 44 is delayed by the delay circuit 32, and then the delayed vertical driving signal $VD_B$ is supplied to set terminal of the flip-flop 3 and the flip-flop is set at a high level. Therefore. the switch 4 is closed and any output signal is not supplied from the voltage controlled oscillator 43 to the first frequency synthesizer 44, and thus the first frequency synthesizer stops its counting operation.

After that, the second frequency synthesizer 46 generates a reset pulse in synchronism with a raising edge of the horizontal driving signal HI in the reference control signal D. When this reset pulse is supplied to the reset terminal R of the flip-flop 3, the output of the flip-flop 3 changes into a low level and the output signal from the voltage controlled oscillator 43 is supplied again to the first frequency synthesizer 44. In this manner, the first frequency synthesizer 44 starts its counting operation again. Therefore, the first frequency synthesizer 44 stops its counting operation after the delay time $T_D$ with respect to the timing at which the vertical driving signal $VD_B$ is generated, and starts again its counting operation at the timing at which the second frequency synthesizer 46 generates the horizontal driving signal H1 as the reference control signal D.

Furthermore, when the vertical phase is locked, i.e. when a phase difference between the vertical driving signal $VD_B$ in the reference control signal B and the vertical driving signal $VD_D$ in the reference control signal D is equal to $T_D$, a pulse is supplied to the set terminal S of the flip-flop 3 after the delay time $T_D$ from a timing at which the first frequency synthesizer 44 generates the vertical driving signal $VD_B$.

Since the phase difference between the vertical driving signal $VD_B$ in the reference control signal B and the vertical driving signal $VD_D$ in the reference control signal D is equal to $T_D$, a reset pulse is supplied to the reset terminal R of the flip-flop 3. In this manner, the flip-flop 3 receives simultaneously the set pulse and reset pulse at its set terminal S and reset terminal R, respectively. In this situation, the flip-flop 3 is designed its output level does not change, and therefore the vertical synchronization is not disturbed at all.

If a time delay $t_D$ introduced by the second video processing circuit 70 is not ignored, the reference control signals A and D have to be advanced by the delay time $t_D$, Since the third video processing circuit 70 is not changed like as the expansion module, the delay time $t_D$ is constant, and thus the advanced phase is also constant. Therefore, compensation for this time delay can be realized simply. That is to say, the reference control signals A may be generated with a time delay of H-$t_D$ with respect to the reference control signal B. Since the PLL circuit operates, the horizontal period H can be remained constant. Also in the present embodiment, the delay time $T_D$ may be longer than H, and therefore it is not necessary to adjust the vertical phase manually.

FIG. 16 is a block diagram showing a third embodiment of the GEN-Lock apparatus according to the invention. Also in the present embodiment, the expansion module 30 including the second video processing circuit 31 is provided between the first video processing circuit and the third video processing circuit 70. The expansion module 30 comprises a second delay circuit 33 in addition to the first delay circuit 32. The reference control signal B generated by the frequency synthesizer 44 is supplied to the first delay circuit 32 and the delayed reference control signal C is supplied to the phase adjusting circuit 45 as the phase comparison signal. The frequency synthesizer 44 generates further reference control signal E. This reference control signal E is supplied to the second delay circuit 33 and the delayed reference control signal D is supplied to the third video processing circuit 70.

FIGS. 17A–17H are timing charts representing the operation of the GEN-Lock apparatus in which the first and second delay circuits 32 and 33 are removed, and FIGS. 18A–18H are timing charts showing the operation of the GEN-Lock apparatus including the first and second delay circuits 32 and 33.

In the present embodiment, the second video processing circuit 31 provided in the expansion module 30 introduces the delay time $T_D$. Then, the frequency synthesizer 44 operates at timings which are advanced by $T_D$. Therefore, if the reference control signal D for the third video processing circuit 70 is generated at this timing, the phase of the reference control signal D is too advanced. In order to delay the reference control signal D by $T_D$ such that this signal has a correct phase, there is arranged the second delay circuit 33 having a delay time of $T_D$, which is identical with the delay time of the first delay circuit 32.

The present invention is not limited to the embodiments explained above, but many alternation and modifications can be conceived by a person skilled in the art within the scope of the invention. In the above embodiments, the GEN-Lock apparatus is applied to the video processing system including the television camera. The GEN-Lock apparatus according to the invention may be equally applied to any other systems in which the phase lock is required for the video signal.

In the above embodiments, the reference control signals A–E contain the horizontal driving signal HD and vertical driving signal VD, however according to the invention, any other signals may be used as the reference control signal. If the horizontal driving signal and vertical driving signal are transmitted over different transmission lines, delay circuits have to be provided in respective transmission lines. It should be further noted that the reference control signals A–E may contain a plurality of signals such as clamping pulse and blanking pulse. In this case, each reference control signals have to be transmitted over respective transmission lines.

As stated above in detail, in the generator-lock apparatus according to the invention, an expansion module comprises a delay circuit having a delay time identical with a delay time introduced by an video processing circuit provided in the expansion module and a reference control signal generated by a phase-lock loop circuit is fed-back through the delay circuit. Therefore, the delay time introduced by the video processing circuit in the expansion module can be automatically compensated for. It is no more necessary to perform a cumbersome readjusting operation for the PLL circuit each time an expansion module is added or replaced by another expansion module.

What is claimed is:

1. An apparatus for performing a generator locking for a video signal comprising:
    a first video processing circuit for processing an input video signal under a control of a reference control signal;
    a phase-lock loop circuit for generating said reference control signal by detecting a phase relationship between an external reference signal supplied to the phase-lock loop and a phase comparison signal having a predetermined phase relationship with said reference control signal;
    an expansion module having a second video processing circuit for processing the video signal and a delay circuit having a delay time which is related to a time introduced by said second video processing circuit; and
    a means for feeding-back said phase comparison signal to said phase-lock loop circuit by means of said delay circuit provided in the expansion module.

2. An apparatus according to claim 1, wherein said second video processing circuit in the expansion module is connected to an output of said first video processing circuit and an output of said second video processing circuit is connected to an output terminal of the apparatus.

3. An apparatus according to claim 2, wherein said delay time of said delay circuit is set to be identical with a delay time introduced by said second video processing circuit in the expansion module.

4. An apparatus according to claim 3, wherein said apparatus further comprises a synchronizing signal separating circuit for separating a synchronizing signal from said external reference signal, and said synchronizing signal is supplied to said phase-lock loop circuit.

5. An apparatus according to claim 4, wherein said phase-lock loop circuit comprises a phase comparator for detecting a phase difference between said synchronizing signal and said phase comparison signal, a low pass filter for producing a control voltage representing said phase difference, a voltage controlled oscillator for generating an oscillation signal having a frequency controlled by said control voltage, a frequency synthesizer for counting said oscillation signal to generate said reference control signal, and a phase adjusting circuit for adjusting a phase of said phase comparison signal.

6. An apparatus according to claim 1, wherein said apparatus further comprises a third video processing circuit, and an input of said second video processing circuit in the expansion module is connected to an output of said first video processing circuit, an output of said second video processing circuit is connected to an input of said third video processing circuit and an output of the third video processing circuit is connected to an output terminal of the apparatus, and said phase-lock loop circuit generates a second reference control signal for said third video processing circuit.

7. An apparatus according to claim 6, wherein said delay time of said delay circuit is set to be identical with a delay time introduced by said second video processing circuit in the expansion module.

8. An apparatus according to claim 7, wherein said apparatus further comprises a synchronizing signal separating circuit for separating a synchronizing signal from said external reference signal, and said synchronizing signal is supplied to said phase-lock loop circuit.

9. An apparatus according to claim 8, wherein said phase-lock loop circuit comprises a phase comparator for detecting a phase difference between said synchronizing signal and said phase comparison signal, a low pass filter for producing a control voltage representing said phase difference, a voltage controlled oscillator for generating an oscillation signal having a frequency controlled by said control voltage, a first frequency synthesizer for counting said oscillation signal to generate said reference control signal for said first video processing circuit as well as said phase comparison signal, a second frequency synthesizer for generating said second reference control signal for said third video processing circuit, a control circuit for controlling said first and second frequency synthesizers, and a phase adjusting circuit for adjusting a phase of said phase comparison signal, and said phase comparison signal generated by said first frequency synthesizer is fed-back to said second frequency synthesizer via said delay circuit provided in the expansion module.

10. An apparatus according to claim 9, wherein said control circuit comprises a flip-flop having a set terminal connected to an output of the delay circuit and a reset terminal connected to an output of the said second frequency synthesizer, and a switch having an input connected to an output of said voltage controlled oscillator and an output connected to an input of said first frequency synthesizer, said switch being controlled by said flip-flop.

11. An apparatus according to claim 8, wherein said expansion module further comprises a second delay circuit, and said second reference control signal is supplied to said third video processing circuit by means of said second delay circuit.

12. An apparatus according to claim 11, wherein said second delay circuits provided in the expansion module has a delay time introduced by said second video processing circuit.

* * * * *